H. L. BOCK.
EQUALIZING GEAR FOR VEHICLE SPRINGS.
APPLICATION FILED JULY 11, 1913.

1,314,784.

Patented Sept. 2, 1919.
2 SHEETS—SHEET 1.

WITNESSES:
James P. Barry
W. K. Ford

INVENTOR
Henry L. Bock
BY
Whittemore Hulbert & Whittemore
ATTORNEYS

H. L. BOCK.
EQUALIZING GEAR FOR VEHICLE SPRINGS.
APPLICATION FILED JULY 11, 1913.
1,314,784.
Patented Sept. 2, 1919.
2 SHEETS—SHEET 2.
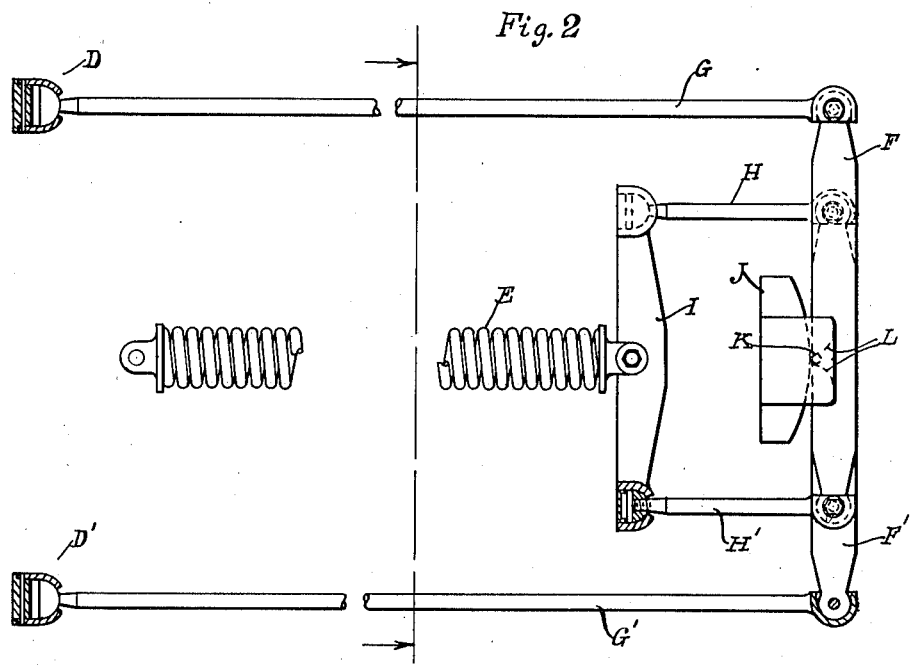
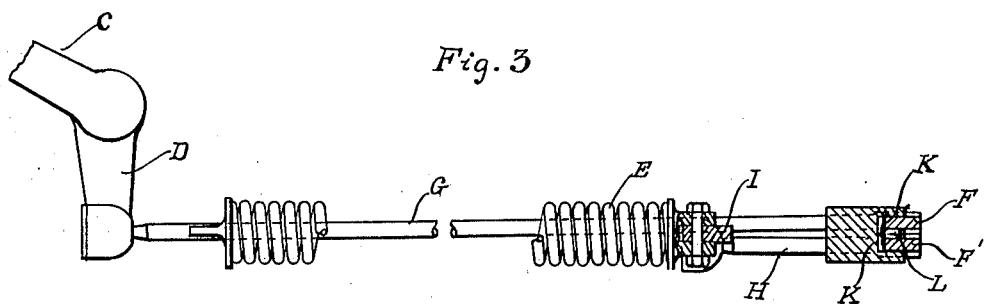
WITNESSES
James P. Barry
W. K. Ford
INVENTOR
Henry L. Bock
BY
Whittemore Hulbert & Whittemore
ATTORNEYS

UNITED STATES PATENT OFFICE.

HENRY L. BOCK, OF TOLEDO, OHIO, ASSIGNOR TO WILLIAM EMIL BOCK, OF TOLEDO, OHIO.

EQUALIZING-GEAR FOR VEHICLE-SPRINGS.

1,314,784.   Specification of Letters Patent.   Patented Sept. 2, 1919.

Application filed July 11, 1913. Serial No. 778,492.

*To all whom it may concern:*

Be it known that I, HENRY L. BOCK, a citizen of the United States of America, residing at Toledo, in the county of Lucas and State of Ohio, have invented certain new and useful Improvements in Equalizing-Gears for Vehicle-Springs, of which the following is a specification, reference being had therein to the accompanying drawings.

The invention relates to vehicle running gears of that type in which the vehicle frame is supported upon wheels independently, vertically yieldable upon opposite sides. It is the object of the present invention to provide means for stabilizing the structure so as to prevent undue tilting under unequally-distributed loads, and to restore the parts to normal position after the passage of obstructions.

In the drawings:

Fig. 2 is an enlarged plan view of the stabilizing mechanism;

Fig. 3 is a side elevation thereof; and

Figure 1:
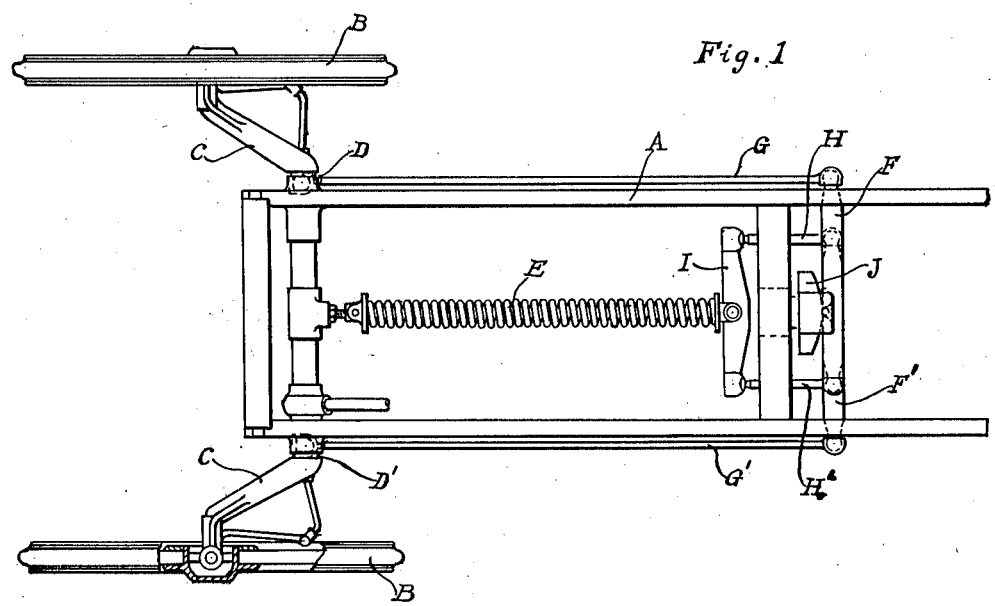
Figure 1 is a plan view of a vehicle of the above-described type, to which my improvements are applied.
Figure 4:
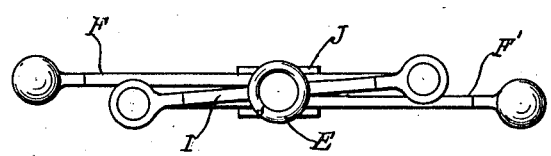
Fig. 4 is an end elevation.

A is the frame of a vehicle, B the supporting wheels, and C rockable arms which connect the wheels B to the frame and permit independent vertical movement thereof. Each of the arms C is provided with a bell crank arm D which is connected to a yieldable resistance, such as a spring E. Thus in passing over a rough road, each of the wheels is free to rise or fall independently of the others, so that obstructions may be passed with a minimum transmission of shocks to the vehicle frame.

A serious objection to the construction as thus far described, is that where the movement of the rock arms C is resisted equally, an unequal distribution of the load will cause the vehicle frame to lean; and furthermore, when the frame is tilted the center of gravity is furthed deflected and the whole structure is therefore unstable and unsatisfactory. I have overcome this objection by the provision of automatic equalizing or stabilizing means so constructed that the very load itself when unequally distributed will operate to restore equilibrium. The same will be true where the vehicle frame is tilted.

Essentially, my improvement comprises an interconnection between independently yieldable wheel supported bearings, which, while permitting an abnormal deflection of any one of the same, will nevertheless effect a distribution of the forces, tending to restore the deflected bearing to its normal position. As specifically shown, this result is obtained by a lever connection between rock arms on opposite sides of the frame, the fulcrums of the levers being shiftable differentially for different deflections. F and F' are two levers, which are respectively connected by links G and G' with the bell crank arms D and D' of the rockable arms C on opposite sides of the frame. These levers F and F' are connected at their opposite ends by links H and H' with an evener lever I, which is preferably connected to the spring E. The levers F and F' are fulcrumed by bearing against a segmental block or bearing J, being held from lateral displacement thereon by pins K engaging flaring notches L. These pins do not, however, prevent the rocking of the levers upon the segmental fulcrum block, nor do they interfere with the shifting of the fulcrum as the lever rocks about said block. Consequently, whenever one of the levers is actuated by a movement of its corresponding rock arm C and bell crank lever D through the medium of the rod G, there will be a shifting in the leverage by the lengthening and shortening of the arms or portions of the levers on opposite sides of the fulcrum. This is equivalent to increasing the tension of the spring E upon the lever which is thus deflected; or, in case the spring is omitted and the lever I is merely fulcrumed, the shifting of the fulcrum of either lever F or F' will give a change in leverage to the opposite one. In other words, the construction is such that the load on the frame reacts equally upon the yieldable wheels on opposite sides when the conditions are normal, but the abnormal deflection of one of the wheels will have the effect of increasing the reaction of the load thereupon so as to restore equilibrium.

From the above, it will be understood that the vehicle, when traveling over rough roads, will pass easily over obstacles or depressions—as each of the wheels is free to rise or fall independently of the other wheels. At the same time, any movement which shifts the center of gravity or which moves the frame into an abnormal position will automatically throw into operation the stabilizing mechanism for restoring the normal equilibrium.

What I claim as my invention is:

1. In a vehicle, the combination with the frame, of independently rockable wheel supported bearings upon opposite sides of said frame, a lever connection between said rockable bearings causing the movement of one to react upon the other differentially in different positions of adjustment, and a yieldable resistance connected to said lever connection reacting upon said bearings equally when in dissimilar positions to restore equilibrium.

2. In a vehicle, the combination with a frame, of independently rockable wheel supported bearings upon opposite sides of said frame, a resilient member for resisting movement of said bearings, and a shiftable-fulcrum lever connection between said bearings and resilient member for differentiating the reaction when in abnormal position to automatically restore equilibrium.

3. In a vehicle, the combination with a frame, of vertically yieldable wheel supported bearings for said frame, tensioning means between said bearings for balancing the load thereon permitting a limited freedom of vertical oscillation thereof without material change in tension, and means for causing a differential increase in tension upon a movement in excess of said limit.

4. In a vehicle, the combination with a frame, of vertically yieldable wheel supported bearings for said frame, tensioning means between said bearings for balancing the load upon said frame and bearings, permitting a limited freedom of oscillation of the latter without change in tension and means for causing a change in tension by a progressively increasing ratio when said limit of movement is exceeded.

5. In a vehicle, the combination with independently movable wheel supported bearings, of a resilient member for resisting movement of said bearings, lever connections between said bearings and connected to said resilient member, and a stationary block between said resilient member and said bearings, providing a shiftable fulcrum for said lever connections when said bearings are in abnormal position.

6. In a vehicle, the combination with independently movable wheel supported bearings, of a fulcrumed lever connection between said bearings including a plurality of fulcrumed levers, the fulcrums being shiftable differentially for different deflections.

7. In a vehicle, the combination with independently movable wheel supported bearings, of a fulcrumed connection between said bearings, the fulcrum being shiftable differentially for different deflections.

8. In a vehicle, the combination with independently movable wheel supported bearings, of a lever connection therebetween, and means for varying the leverage of said connection upon abnormal deflections of either bearing to restore equilibrium.

In testimony whereof I affix my signature in presence of two witnesses.

HENRY L. BOCK.

Witnesses:
R. F. SCHNEIDER,
A. C. BALL.